(12) United States Patent  
Spicer

(10) Patent No.: US 8,596,597 B1  
(45) Date of Patent: Dec. 3, 2013

(54) PAINT ROLLER SUPPORT DEVICE

(76) Inventor: Simone Spicer, Wyndmoor, PA (US)

( * ) Notice: Subject to any disclaimer, the term of this patent is extended or adjusted under 35 U.S.C. 154(b) by 120 days.

(21) Appl. No.: 12/983,944

(22) Filed: Jan. 4, 2011

(51) Int. Cl.
  *A47F 5/00* (2006.01)
  *E04G 25/00* (2006.01)
  *F16M 13/00* (2006.01)

(52) U.S. Cl.
  USPC .............. 248/351; 248/80; 248/81; 248/83; 248/163.1; 248/440.1; 248/528; 248/529; 248/168; 15/230.11

(58) Field of Classification Search
  USPC ............ 248/80, 81, 83, 105, 106, 139, 163.1, 248/440.1, 351, 354.6, 528, 529, 168; 206/361; 15/230.11
  See application file for complete search history.

(56) References Cited

U.S. PATENT DOCUMENTS

| | | | | |
|---|---|---|---|---|
| 1,128,248 A | * | 2/1915 | Hetzel | 248/85 |
| 1,282,488 A | * | 10/1918 | Streever | 248/688 |
| 1,382,409 A | * | 6/1921 | Butler | 42/94 |
| 1,594,365 A | * | 8/1926 | Haubroe | 89/40.06 |
| 2,706,610 A | * | 4/1955 | Roberts | 248/168 |
| 2,736,525 A | * | 2/1956 | Jones | 248/83 |
| 3,832,749 A | | 9/1974 | Hawk | |
| 4,025,205 A | | 5/1977 | Hawk | |
| 4,194,711 A | * | 3/1980 | Winton | 248/49 |
| 4,988,063 A | * | 1/1991 | Pucillo | 248/83 |
| 5,322,250 A | * | 6/1994 | Wilhite, Jr. | 248/166 |
| 5,452,872 A | * | 9/1995 | Barnes et al. | 248/85 |
| 5,492,230 A | * | 2/1996 | Horton | 211/70.2 |
| 5,546,625 A | * | 8/1996 | Mealey, Sr. | 15/105 |
| 5,711,103 A | * | 1/1998 | Keng | 42/94 |
| 5,788,193 A | * | 8/1998 | Hilbert | 248/80 |
| 6,073,362 A | | 6/2000 | Dean et al. | |
| 6,113,040 A | * | 9/2000 | Yu | 248/166 |
| 6,254,044 B1 | * | 7/2001 | Lee | 248/177.1 |
| 6,283,875 B1 | * | 9/2001 | Jones | 473/282 |
| 6,450,185 B1 | * | 9/2002 | Sallinen | 134/138 |
| 6,505,429 B2 | * | 1/2003 | Percival | 42/94 |
| 6,640,369 B1 | | 11/2003 | Malvasio | |
| 7,096,530 B2 | * | 8/2006 | Goulet | 15/144.4 |
| 7,120,963 B2 | | 10/2006 | Kim | |
| 7,380,486 B1 | * | 6/2008 | Bean | 89/37.04 |
| 7,426,800 B2 | * | 9/2008 | Pierce et al. | 42/94 |
| 7,552,819 B2 | * | 6/2009 | Fernandes | 206/15.3 |
| 7,568,668 B2 | * | 8/2009 | Taekema et al. | 248/166 |
| 2007/0034535 A1 | | 2/2007 | Fernandes | |
| 2009/0106919 A1 | * | 4/2009 | Montgomery | 15/105 |

* cited by examiner

*Primary Examiner* — Terrell McKinnon  
*Assistant Examiner* — Michael McDuffie  
(74) *Attorney, Agent, or Firm* — Woodcock Washburn LLP

(57) ABSTRACT

There is disclosed a paint roller support device attachable or integrally mounted to a roller frame handle or extension handle. The support device comprises a pair of legs that are pivotable with respect to each other, thereby defining open and closed positions, and further pivotable away from the roller frame handle or extension handle. When the legs are in the open position and oriented away from the long axis of the roller frame/extension handle, the support device provides a generally planar support surface by which the roller frame/extension handle can be placed on the floor, on a table or against a wall such that a nap of a roller cover is spaced apart from the resting surface.

16 Claims, 6 Drawing Sheets

PAINT ROLLER SUPPORT DEVICE

TECHNICAL FIELD

The present invention relates generally to paint rollers and more particularly to an accessory for, and/or modification to, paint rollers.

BACKGROUND

Paint rollers are well known. A known problem with the use of paint rollers is that, once the nap of the roller cover has become wet with paint, the roller can not be placed on the floor or rested against a wall without getting paint on the floor or wall, because the wet roller nap contacts the resting surface. Commonly, the painter keeps a paint tray or paint bucket nearby while painting to provide a repository for the wet roller. This is frequently an inconvenience, since the painter needs to return the roller to the tray or bucket during periods of rest or while painting trim with a brush.

SUMMARY

There is described a folding or collapsible support device for a paint roller. The support device is attached, or otherwise mounted, to the paint roller frame (e.g., to the roller handle). The support device functions as a "kick stand," such that, when unfolded or extended, allows the paint roller to rest on a floor or against a wall while maintaining the roller nap a safe distance there-from, so as to prevent contact between the floor or wall surface and the nap. When the painter wishes to resume painting, the support device can be folded, collapsed or tucked neatly away such that it does not interfere with use of the roller.

In one embodiment, the support device comprises first and second legs. The legs are pivotable between open and closed positions, such that, in the open position, the roller can be rested on the floor or against the wall while maintaining the nap safely away there-from. In the closed position, the support device is folded, collapsed or tucked neatly away so as to allow use of the roller without interference from the support device.

The support device may be either an add-on accessory to the paint roller and/or to a paint roller extension pole, or may be provided as an integral feature of the roller and/or pole.

BRIEF DESCRIPTION OF THE DRAWINGS

FIG. 1 illustrates the support device in the open position.

FIG. 2 shows the support device in the open position;

In FIG. 3, the support device is in the closed position;

FIG. 4 shows the support device in the open position;

DETAILED DESCRIPTION OF ILLUSTRATIVE EMBODIMENTS

Figure 1:
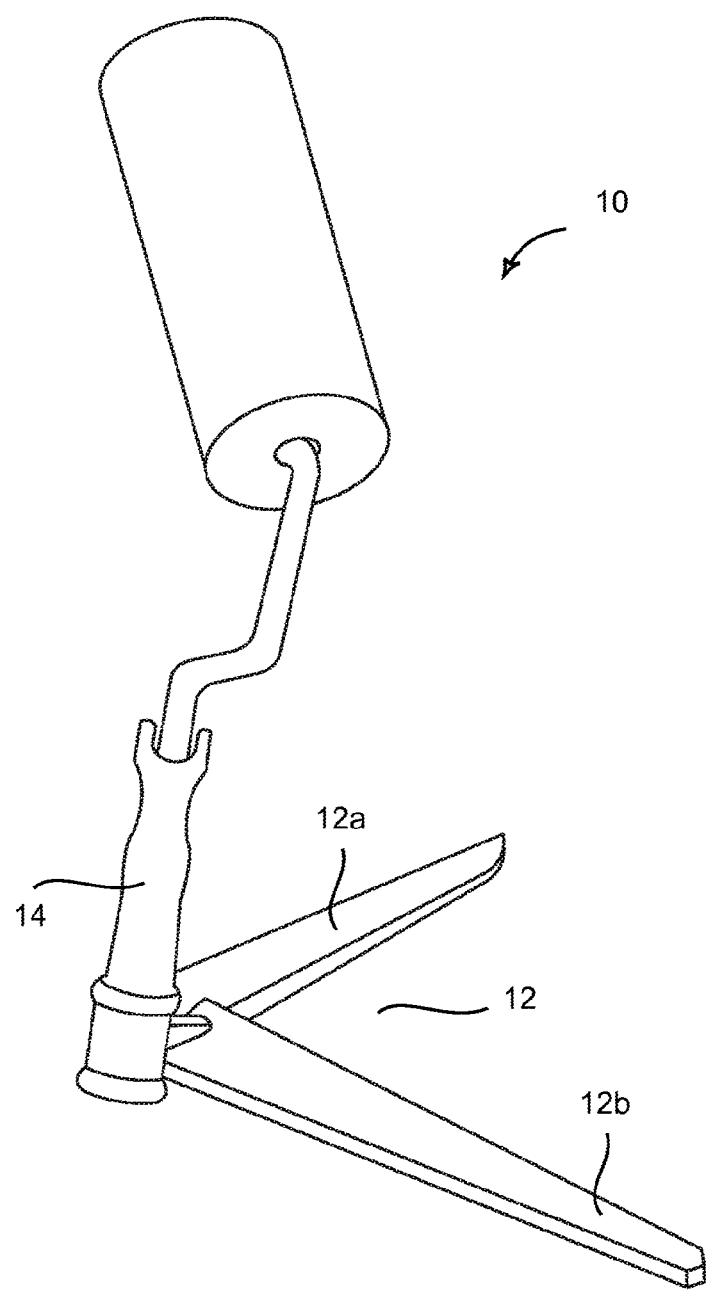
FIG. 1 illustrates a paint roller having a support device, in accordance with an embodiment of the invention.
Figure 2:
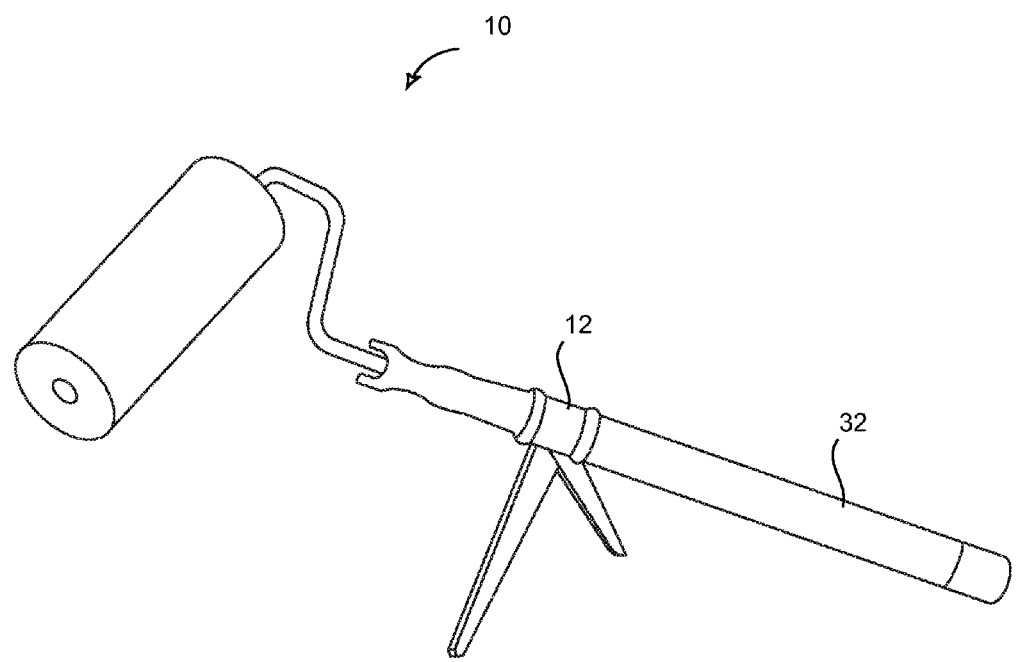
FIG. 2 illustrates a paint roller with an extension pole and having a support device, in accordance with an embodiment of the invention.

Referring to the drawings, wherein like numerals represent like elements, there is shown in FIG. 1 a paint roller 10 having a support device 12 attached to, connected to, or integrated with, the base of the handle 14 of the paint roller 10. FIG. 1 illustrates use of the support device 12 on a paint roller handle for those cases wherein a paint roller extension pole may not be used. FIG. 2 illustrates use of the support device 12 in conjunction with a paint roller 10 and an extension pole 32.

The support device 12 includes first and second legs 12a, 12b. As shown in FIG. 1, when used with a paint roller alone, the open legs provide a generally planar support surface by which the roller 10 can be positioned relatively upright on the floor or on a table. As shown in FIG. 2, when used in conjunction with both a roller 10 and an extension pole 32, the open legs provide support points by which the roller/pole combination can be placed on the floor, on a table, or against a wall.

The support device 12 is described herein as an add-on accessory that can be attached to the handle 14 and/or extension pole 32 via an adapter. However, as those skilled in the art will readily appreciate, the support device may be integral to the handle 14 or extension pole 32 (i.e., without the use of an adapter described herein).

Figure 3:
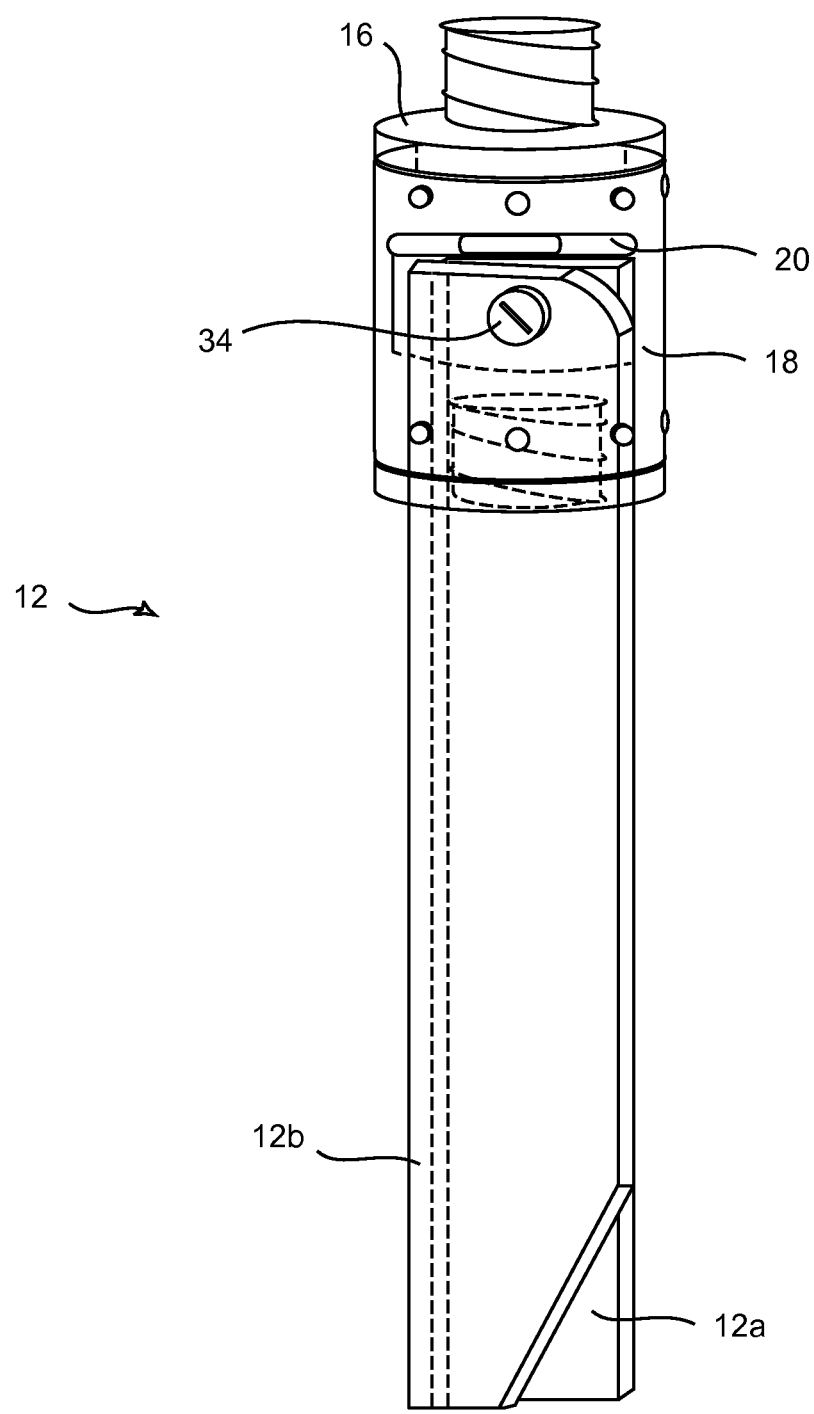
FIG. 3 illustrates a support device, and an adapter for connecting the support device to a roller handle and/or extension pole, in accordance with an embodiment of the invention.

As shown in FIG. 3, adapter 16 may be used to connect the support device 12 to the handle 14 and/or extension pole 32. In particular, as described further below, one end of the adapter has a threaded male end 24 that can be threadedly received by the roller handle 14, and a threaded female end 26 that can threadedly receive the extension pole 32. The adapter 16 comprises a core 36 having the male and female ends 24, 26 (for connecting the roller handle 14 and/or extension pole 32), a removable cuff 18 around the core 36, and a hinge 20, or other pivotable device, or a device defining radial rotation about a pivot point (both "hinge"), connected to the cuff (for connecting the support device 12). The support device 12 is pivotably connected to the adapter 16 by hinge 20, and the legs 12a and 12b are pivotably connected to the hinge 20 by means of fastener 34. The support device 12 therefore is able to pivot in a plane that is generally perpendicular to the plane in which the individual legs 12a, 12b are able to pivot. See FIG. 4.

As shown, the legs 12a, 12b may be in the shape of blades, with their bottom edges chamfered to provide a substantially flat edge, so as to allow a secure contact with a base surface. However, other leg geometries may be employed. In one embodiment, the legs 12a, 12b are approximately 9" long, or about the length of a standard roller nap; however, any leg length sufficient to support the roller frame in the above identified orientations is considered within the scope of this invention. The legs 12a, 12b may be constructed from any type of rigid and impact resistant material, such as plastic or metal. A semi circular cut out 22 may be provided in one of the legs to provide a surface for cleaning paint from a used roller nap.

Figure 4:
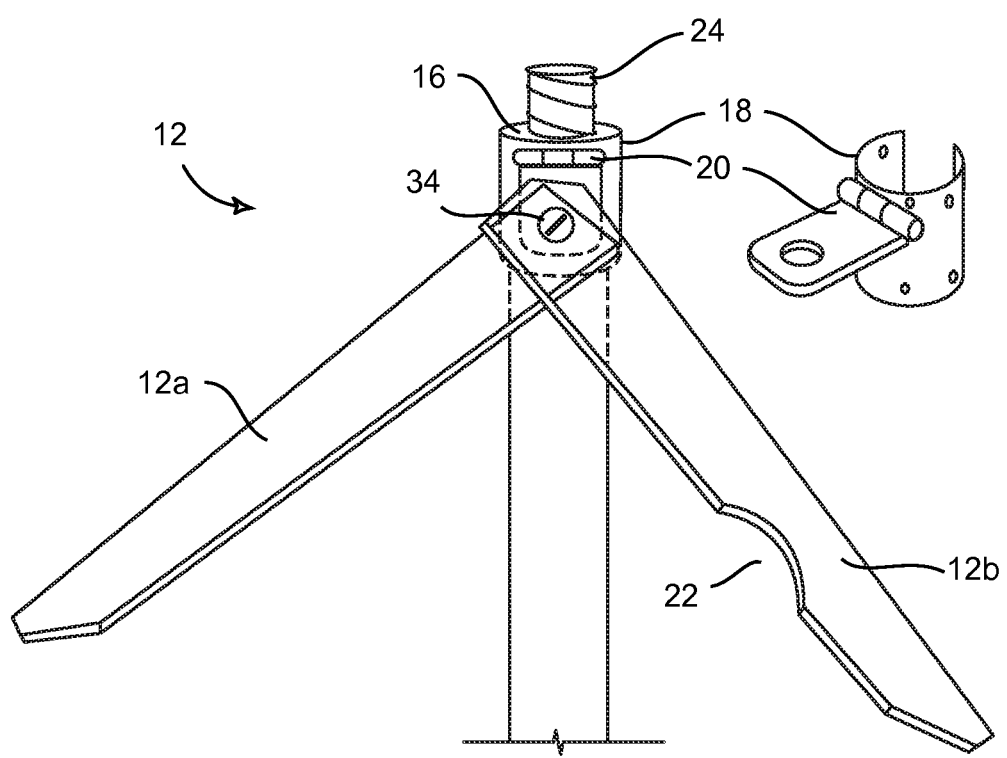
FIG. 4 illustrates further details of the support device and adapter of FIG. 3.
Figure 5:
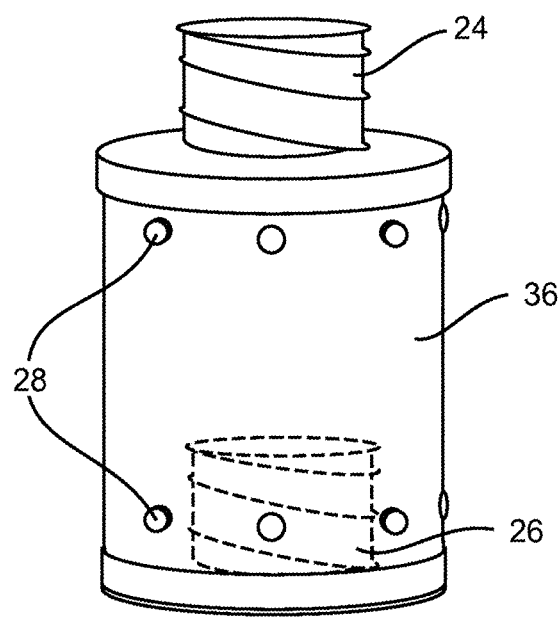
FIG. 5 illustrates further details of adapter of FIG. 3.
Figure 6:
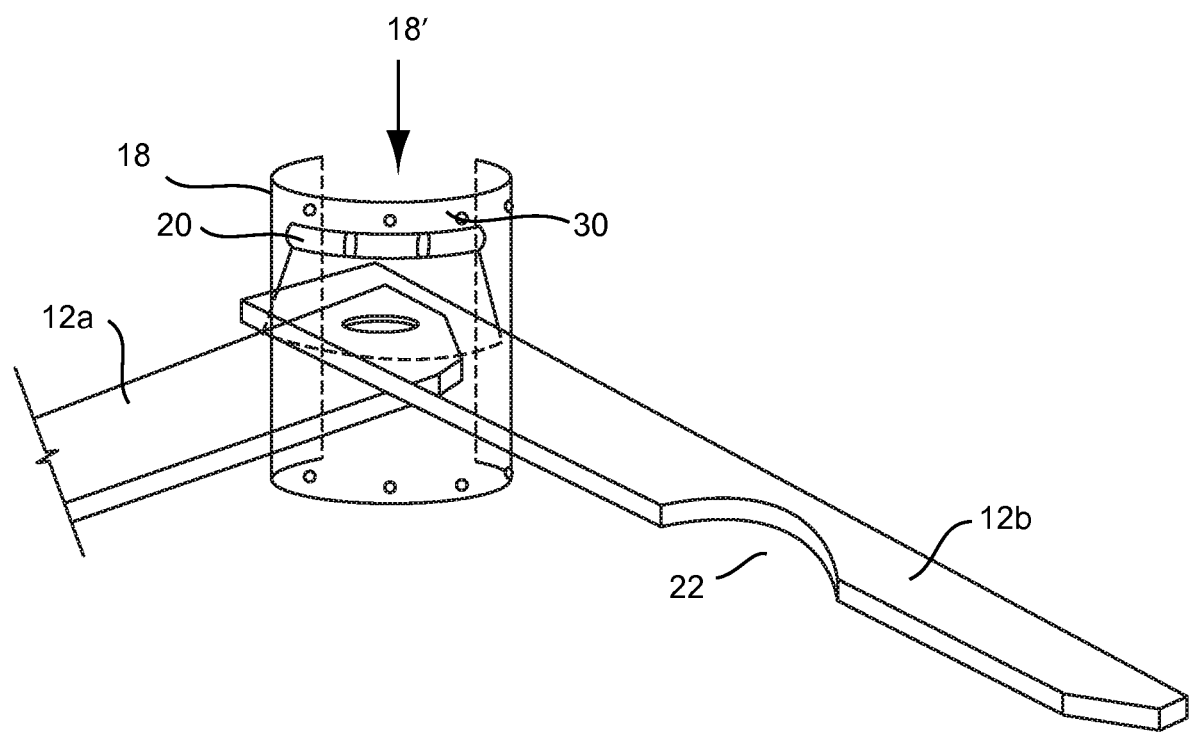
FIG. 6 illustrates further details of support device and adapter of FIG. 3.

As shown in FIG. 5, core 36 also has dimples or projections 28 that mate with holes 30 in the cuff 18 for allowing the cuff to be securely received onto the core, and to be removed when desired. Cuff 18 is preferably constructed from a flexible metal or plastic and is shaped with a circumferential geometry that is substantially consistent with the circumferential geometric shape of the core 36. As shown in FIGS. 4 and 6, an axial opening 18' in the cuff allows it to be snapped-onto and removed from the core 36.

Hinge 20 is connected to the legs 12a, 12b using any convenient fastening means, such as a screw, bolt or rivet. The hinge allows the support device to rotate from a first orientation approximately parallel to the roller handle and/or extension pole to a second orientation, i.e., in a radial direction (with respect to the axis of the handle) away from the roller handle/extension pole. Hinge 20 may be ratcheted, allowing it to lock and release in these two positions. As mentioned above, legs 12a, 12b may be secured together using a screw, bolt, rivet, or other similar mechanical fastener 34 such that the legs can pivot from the closed (overlapping) position to the open (span) position. The legs 12a, 12b may ratchet, such that the legs can be locked into and released in these two positions. A stop, such as a mechanical barrier, may be provided at the top of leg 12a so as to prevent leg 12b from pivoting past the desired angular offset. To aid in the cleaning of the legs, the fastening element 34 may be removable.

As will be appreciated, a storage position for the support device is defined when the legs are in the first and closed orientations. When the legs have been extended to the second and open orientation, the support device is ready for use.

The support device and adapter are assembled and coupled to the roller frame by threading the male end 24 of the core 36 into the handle of the roller frame, and then mounting the cuff to the core as described above. If desired, an extension handle may be attached to the adapter by threading the male end of the pole 32 into the female end 26 of the core. If not already assembled thereto, legs 12a, 12b (i.e., the support device) may be attached to the hinge 20 as described above. When assembled, the hinge 20 allows the support device (legs 12a, 12b) to rotate from a first orientation approximately parallel to the long axis of the roller frame to a second orientation away from the handle/pole. Likewise, the legs 12a, 12b are allowed to pivot relative to each other to spread them to the open position. The roller frame (and, if provided, extension pole) is now ready to placed on the floor or a table, or against the wall. When painting is to resume, the legs are pushed together and the support device is rotated back along the handle/pole.

While the invention is susceptible to various modifications and alternative constructions, certain illustrated embodiments have been shown in the drawings and accompanying detailed description. It should be understood, however, that there is no intention to limit the invention to the specific constructions disclosed herein. On the contrary, the invention is intended to cover all modifications, alternative constructions, and equivalents falling within the scope and spirit of the invention.

What is claimed:

1. A paint roller frame comprising an elongate portion defining a handle having a central axis, and a hinged member that is rotatable in a first radial direction between a first position generally coaxial with the central axis and a second position extending angularly away from the central axis, the hinged member supporting a pair of legs on a pivot such that the pivot is adjacent the hinge and such that the legs are pivotable with respect to each other in a second radial direction between open and closed positions, the first and second radial directions being angularly offset with respect to each other, wherein, when the hinged member is in the second position and the legs are in the open position, the legs provide a support for maintaining a nap of a roller cover disposed on the roller frame away from a surface upon which the legs are permitted to rest.

2. The paint roller frame of claim 1 further comprising an adapter affixed to the handle, the hinged member being fixed to the adapter.

3. The paint roller frame of claim 2 wherein the adapter comprises a core portion having a threaded male end for threadedly engaging the handle and a female end for threadedly engaging an extension pole.

4. The paint roller frame of claim 1 wherein the adapter further comprises a cuff carrying the hinged member, the hinged member being fixed to the cuff.

5. The paint roller frame of claim 1 wherein the hinged member is ratcheted so as to lock into the first and second positions.

6. The paint roller frame of claim 1 wherein the legs are ratcheted so as to lock into the open and closed positions.

7. The paint roller frame of claim 1 wherein the legs are planar and at least one of the legs has an arcuate cut-out defining a portion for cleaning the roller nap.

8. The paint roller frame of claim 1, wherein the hinged member is removably attachable to the handle.

9. A paint roller frame comprising (i) an elongated portion defining a handle with a central axis and (ii) a support device, the support device comprising a hinged member rotatable in a first radial direction between a first position generally coaxial with the central axis and a second position extending angularly away from the central axis, the hinged member supporting a pair of legs on a pivot such that the pivot is adjacent the hinge and such that the legs are pivotable with respect to each other in a second radial direction between open and closed position, the first and second radial directions being angularly offset with respect to each other, wherein, when the hinged member is in the second position and the legs are in the open position, the legs provide a support for maintaining a nap of a roller cover disposed on the roller frame away from a surface upon which the legs are permitted to rest.

10. The paint roller frame of claim 9 wherein the legs are planar and at least one of the legs has an arcuate cut-out defining a portion for cleaning the roller nap.

11. The paint roller frame of claim 9 wherein the hinged member is ratcheted so as to lock into the first and second positions and the legs are ratcheted so as to lock into the open and closed positions.

12. An elongated paint roller extension pole having a central axis and comprising a support device having a hinged member rotatable in a first radial direction between a first position generally coaxial with the central axis and a second position extending angularly away from the central axis, the hinged member supporting a pair of legs on a pivot such that the pivot is adjacent the hinge and such that the legs are pivotable with respect to each other in a second radial direction between open and closed position, the first and second radial directions being angularly offset with respect to each other, wherein, when the hinged member is in the second position and the legs are in the open position, the legs provide a support for maintaining a nap of a roller cover disposed on the roller frame away from a surface upon which the legs are permitted to rest.

13. The paint roller extension pole of claim 12, wherein the hinge is removably attachable to the pole.

14. Apparatus comprising an elongate paint roller frame having disposed thereon a hinged member adjustable in a first direction between an extended position and a collapsed position relative to the elongate frame, the hinged member having disposed thereon a pair of legs wherein the legs are pivotable thereupon via a pivot in a second direction different from the first direction and that can be opened and closed relative to the hinged member, and wherein the pivot is adjacent the hinge.

15. A method for resting a paint roller on a flat surface comprising:

affixing to a handle of the paint roller an apparatus comprising a hinged member adjustable in a first direction between an extended position and a collapsed position relative to the elongate frame, the hinged member having disposed thereon a pair of legs wherein the legs are pivotable thereupon via a pivot in a second direction different from the first direction and that can be opened and closed relative to the hinged member, wherein the pivot is adjacent the hinge;

adjusting the hinged member to the collapsed position and the legs to the closed position for using the paint roller to paint; and, adjusting the hinged member to the extended position and the legs to open position for resting the paint roller adjacent the flat surface.

16. A method for resting a paint roller on a flat surface comprising:

affixing to an extension pole attached to the paint roller an apparatus comprising a hinged member adjustable in a first direction between an extended position and a collapsed position relative to the extension pole, the hinged member having disposed thereon a pair of legs wherein the legs are pivotable thereupon via a pivot in a second direction different from the first direction and that can be opened and closed relative to the hinged member, wherein the pivot is adjacent the hinge;

adjusting the hinged member to the collapsed position and the legs to the closed position for using the paint roller to paint; and, adjusting the hinged member to the extended position and the legs to open position for resting the paint roller adjacent the flat surface.

\* \* \* \* \*